Patented Mar. 14, 1933

1,901,824

UNITED STATES PATENT OFFICE

WALTER SCHOELLER, OF BERLIN-CHARLOTTENBURG, HANS JORDAN, OF BERLIN-STEGLITZ, AND REINHARD CLERC, OF BERLIN, GERMANY, ASSIGNORS TO THE FIRM SCHERING-KAHLBAUM AKTIENGESELLSCHAFT

PRODUCTION OF PHENOLIC COMPOUNDS

No Drawing. Application filed February 23, 1928, Serial No. 256,480, and in Germany March 11, 1927.

Our invention refers to the production of alkyl isoalkylene phenols which form the starting materials for the preparation of odorants and disinfecting agents. These compounds can be obtained by thermic decomposition of the condensation products of ketones with alkylated phenols which are obtained according to the method described and claimed in a copending application for patent of the United States, Serial No. 200,289, filed June 20, 1927, by Hans Jordan. The thermic decomposition is described more specifically in the same inventor's copending applications Serial No. 200,290, filed June 20, 1927, and Serial No. 211,637, filed August 8, 1927.

We have now found that such thermic decomposition can be effected in a particularly advantageous manner by heating the condensation products in the vapor phase at a temperature above 300° C. Preferably evaporation of the condensation products is effected in vacuo at a comparatively low temperature. We have further found that the thermic decomposition is greatly facilitated by the presence of surface catalysts. Such surface catalysts are for instance magnesium-aluminium silicates, decomposed with a mineral acid, which are known as "frankonite" and tonsil, fuller's earth, diatomite, silica gel, active carbon and similar porous bodies. The efficiency of these catalysts can be increased by precipitating thereon catalytically active metals or metal compounds, for instance nickel or nickel oxide.

We have found it particularly advantageous to conduct the condensation products in the vapor phase across the heated surface catalysts. The constitution of the condensates obtained by subsequent cooling of the decomposition products can be influenced to a great extent by varying the velocity of flow of the vapor and the temperature, so that it is thus rendered possible to recover either homogeneous products or mixtures of varying composition.

*Example 1*

The product of condensation from m-cresol and acetone, prepared by acting with acetone at a moderate temperature below 100° C. on m-cresol in the presence of hydrochloric acid gas, is subjected to distillation in vacuo. The reaction occurs according to the equation

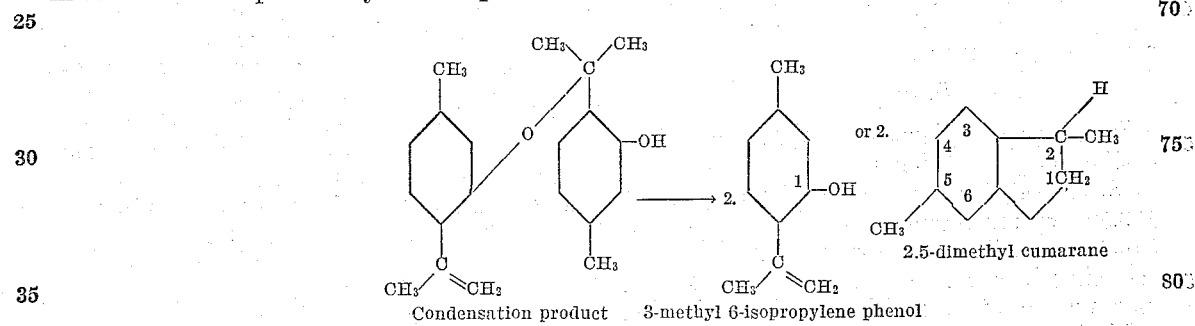

Condensation product    3-methyl 6-isopropylene phenol    2.5-dimethyl cumarane

The vapors are conducted through a tube heated to above 300° C. In order to secure a better transmission of heat the tube is preferably charged with some suitable filling material. By condensation of the vapors issuing from the tube there is obtained a mixture of 3-methyl-6-isopropylene phenol and alkylated cumarane, which starts boiling in a vacuum of 11 mms. mercury column at 98° C. and can be separated by fractional distillation into 2.5 dimethyl cumarane and 3-methyl-6-isopropylene phenol.

*Example 2*

The condensation product from p-cresol and acetone, obtained as described (for m-cresol) with reference to Example 1, is treated as described with reference to Example 1. The reaction occurs according to the equation

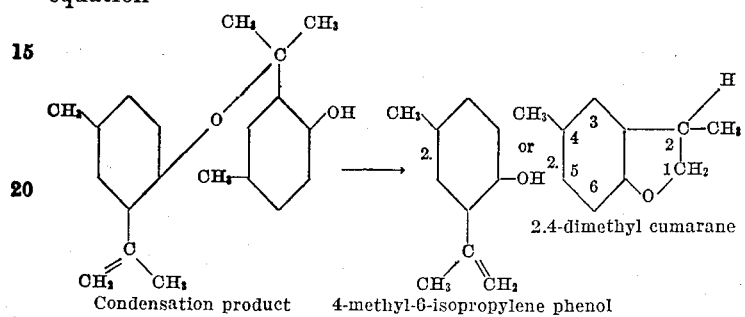

Condensation product     4-methyl-6-isopropylene phenol

There is obtained a mixture of 4-methyl-6-isopropylene phenol and alkylated cumarane.

*Example 3*

The condensation product from m-cresol and acetone prepared as described with reference to Example 1 is conducted at a temperature of 210–280° C. across a surface catalyst, for instance frankonite. There is obtained a mixture of 3-methyl-6-isopropylene phenol and alkylated cumarane, which boils at 11 mms. pressure at 102° C. and can be separated by fractional distillation into 2.4 dimethyl cumarane and 4-methyl-6-isopropylene phenol.

*Example 4*

The condensation product from p-cresol and acetone is treated as described with reference to Example 3. There is obtained a mixture of 4-methyl-6-isopropylene phenol and alkylated cumarane.

*Example 5*

In the process described in Example 3 or 4 silica gel, on which nickel is precipitated as described for instance in British Patent 159,508, by impregnating the gel with a solution of nickel nitrate, drying, calcining and reducing in a current of hydrogen, is used as a surface catalyst in lieu of the frankonite.

Various changes may be made in the details disclosed in the foregoing specification without departing from the invention or sacrificing the advantages thereof.

We claim:—

1. The method of decomposing condensation products obtained by acting with acetone on a cresol of the group consisting of m- or p-cresol in the presence of hydrochloric acid gas at a temperature slightly above room temperature and which have the formula:

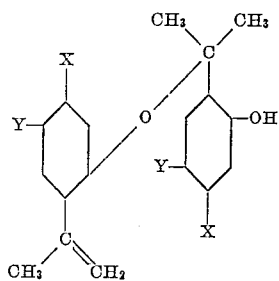

wherein, in both nuclei, when X is H, Y may be $CH_3$ or, when X is $CH_3$, Y may be H, comprising heating such products in the vapor phase at a temperature of about 300° C.

2. The method of decomposing condensation products obtained by acting with acetone on m-cresol in the presence of hydrochloric acid gas at a temperature slightly above room temperature and which have the formula:

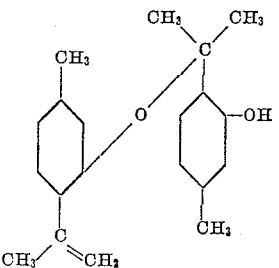

comprising heating such products in the vapor phase at a temperature of about 300° C.

3. The method of decomposing condensation products obtained by acting with acetone on a cresol of the group consisting of m- or p-cresol in the presence of hydrochloric acid gas at a temperature slightly above room temperature and which have the formula:

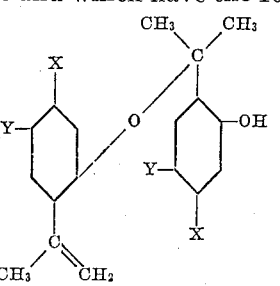

wherein, in both nuclei, when X is H, Y may be $CH_3$ or, when X is $CH_3$, Y may be H, comprising heating such products in the vapor phase at a temperature of 210–280° C. in the presence of a surface catalyst.

4. The method of decomposing condensation products obtained by acting with acetone on a cresol of the group consisting of m- or p-cresol in the presence of hydrochloric acid gas at a temperature slightly above room temperature and which have the formula:

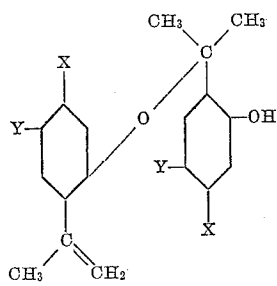

wherein, in both nuclei, when X is H, Y may be $CH_3$ or, when X is $CH_2$, Y may be H, comprising subjecting such products in the vapor phase to the action of a surface catalyst combined with a catalyst containing a metal of the iron group.

5. The method of decomposing condensation products obtained by acting with acetone on a cresol of the group consisting of m- or p-cresol in the presence of hydrochloric acid gas at a temperature slightly above room temperature and which have the formula:

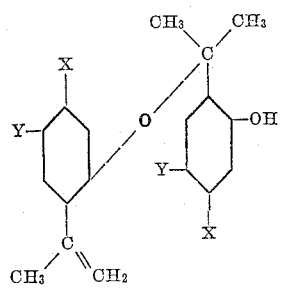

wherein, in both nuclei, when X is H, Y may be $CH_3$ or, when X is $CH_3$, Y may be H, comprising subjecting such products in the vapor phase to the action of a surface catalyst combined with a catalytically active metal of the iron group.

6. The method of decomposing condensation products obtained by acting with acetone on m-cresol in the presence of hydrochloric acid gas at a temperature slightly above room temperature and which have the formula:

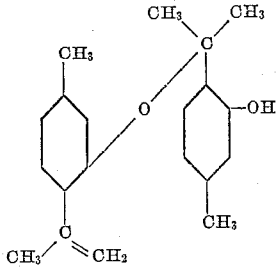

comprising heating such products in the vapor phase at a temperature of 210–280° C. in the presence of a surface catalyst.

7. The method of decomposing condensation products obtained by acting with acetone on m-cresol in the presence of hydrochloric acid gas at a temperature slightly above room temperature and which have the formula:

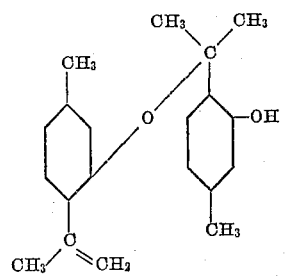

comprising subjecting such products in the vapor phase to the action of a surface catalyst combined with a catalyst containing a metal of the iron group.

8. The method of decomposing condensation products obtained by acting with acetone on m-cresol in the presence of hydrochloric acid gas at a temperature slightly above room temperature and which have the formula:

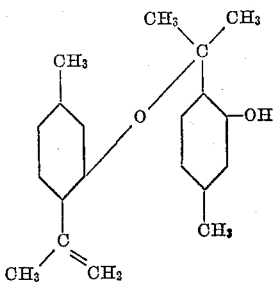

comprising subjecting such products in the vapor phase to the action of a surface catalyst combined with a catalytically active metal of the iron group.

In testimony whereof we affix our signatures.

WALTER SCHOELLER.
HANS JORDAN.
REINHARD CLERC.